United States Patent
Teetzel et al.

(10) Patent No.: US 9,778,453 B2
(45) Date of Patent: Oct. 3, 2017

(54) MODULAR NIGHT VISION SYSTEM

(71) Applicant: WILCOX INDUSTRIES CORP., Newington, NH (US)

(72) Inventors: James W. Teetzel, Portsmouth, NH (US); Ned A. Dalzell, Portsmouth, NH (US)

(73) Assignee: Wilcox Industries Corp., Newington, NH (US)

(*) Notice: Subject to any disclaimer, the term of this patent is extended or adjusted under 35 U.S.C. 154(b) by 66 days.

(21) Appl. No.: 14/338,893

(22) Filed: Jul. 23, 2014

(65) Prior Publication Data
US 2015/0323777 A1    Nov. 12, 2015

Related U.S. Application Data

(60) Provisional application No. 61/863,988, filed on Aug. 9, 2013.

(51) Int. Cl.
*G02B 23/12* (2006.01)

(52) U.S. Cl.
CPC .................. *G02B 23/125* (2013.01)

(58) Field of Classification Search
CPC .............................. G02B 23/125; G02B 23/16
USPC ............ 250/201.1; 2/2.5, 6.2, 422; 359/409, 359/815; 42/146, 114; 24/580.1, 590.1
See application file for complete search history.

(56) References Cited

U.S. PATENT DOCUMENTS

| | | | | |
|---|---|---|---|---|
| 5,535,053 A | * | 7/1996 | Baril | G02B 23/125 250/214 VT |
| 6,087,660 A | * | 7/2000 | Morris | G02B 23/125 250/214 VT |
| 7,219,370 B1 | * | 5/2007 | Teetzel | A42B 3/04 2/422 |
| 2006/0162227 A1 | * | 7/2006 | Samson | F41C 27/00 42/148 |
| 2007/0068058 A1 | * | 3/2007 | Remo | F41G 11/003 42/122 |
| 2008/0263752 A1 | * | 10/2008 | Solinsky | A42B 3/042 2/422 |
| 2012/0114983 A1 | * | 5/2012 | Stokes | H01M 2/1022 429/50 |

* cited by examiner

*Primary Examiner* — Renee Chavez
(74) *Attorney, Agent, or Firm* — McLane Middleton, Professional Association (57) ABSTRACT

A modular mounting system for a night vision device includes one or more night vision monoculars, each night vision monocular having an imaging tube, a housing, and a first mounting shoe at a first position on the housing. A power supply has a first fastener thereon. A helmet mount at a first location on a helmet has a second fastener thereon. A power supply interface is located at a second location on the helmet and a second mounting shoe is provided on the power supply interface. The first mounting shoe is interchangeably and removably attachable to the first fastener and the second fastener, and, the first fastener interchangeably and removably attachable to the first mounting shoe and the second mounting shoe. In a further aspect, a firearm rail interface is provided to allow the night vision monocular to alternatively be positioned on a firearm accessory rail.

20 Claims, 10 Drawing Sheets

MODULAR NIGHT VISION SYSTEM

RELATED APPLICATION

This application claim the benefit of provisional application No. 61/863,988 filed Aug. 9, 2013. The entire contents of the aforementioned provisional application are incorporated herein by reference.

BACKGROUND

The present disclosure relates to an improved modular system which provides multiple options for interchangeably mounting a night vision device to headgear such as a tactical or military field helmet and a firearm. The system herein provides multiple options for a monocular or binocular night vision device, multiple flip options for moving an attached night vision device between a viewing position when the device is in use on a helmet and a stowed position out of the user's line of sight when the viewing device is not in use. The system herein is also adapted to provide multiple options for moving a night vision device in and out of the optical axis of a weapon-mounted scope or sight when used on a weapon. The system according to this disclosure is particularly suited for use with night vision devices that enable viewing under nighttime or other low light conditions, such as a night vision goggle (NVG) device or enhanced night vision goggle (ENVG) device, although it will be recognized that the system herein could be adapted for use with other optical, opto-electronic, or electronic viewing devices.

SUMMARY

A modular mounting system for a night vision device includes one or more night vision monoculars, each night vision monocular having an imaging tube, a housing, and a first mounting shoe at a first position on the housing. A power supply has a first fastener. A helmet mount is disposed at a first location on a helmet and has a second fastener. A power supply interface is disposed at a second location on the helmet and a second mounting shoe is provided on the power supply interface. The first mounting shoe is interchangeably and removably attachable to the first fastener and the second fastener. The first fastener is interchangeably and removably attachable to the first mounting shoe and the second mounting shoe.

In a more limited aspect, the modular mounting system further includes a first set of electrical contacts on the first fastener that contact a second set of electrical contacts on the first mounting shoe when the first fastener is attached to the first mounting shoe, and, a third set of electrical contacts on the second mounting shoe that contact the first set of electrical contacts when the first fastener is attached to the second mounting shoe.

In another more limited aspect, the modular mounting system further includes a fourth set of electrical contacts on the second fastener that contact the second set of electrical contacts on the first mounting shoe when the second fastener is attached to the first mounting shoe.

In yet another more limited aspect, the modular mounting system further includes electrical conductors electrically coupling the third set of contacts to the fourth set of contacts.

In still another more limited aspect, the modular mounting system of further includes a second mounting shoe at a second location on the housing.

In another more limited aspect, the modular mounting system further comprises a firearm mounting system, the firearm mounting system including: a rail clamp for removably attaching the firearm mounting system to a rail interface of a firearm; and a third fastener attached to the rail clamp, the third fastener removably attachable to the second mounting shoe.

In yet another more limited aspect, the modular mounting system further includes a hinge pivotally attaching the third fastener to the rail clamp, the hinge pivotal about an axis parallel to an axis of the firearm.

In another more limited aspect, the modular mounting system further comprises a third fastener on the helmet mount adjacent the second fastener, wherein the first mounting shoe is interchangeably and removably attachable to the first fastener, the second fastener, and the third fastener.

In still another more limited aspect, the modular mounting system further includes a first one of the one or more night vision monoculars removably attached to the second fastener; and a second one of the one or more night vision monoculars removably attached to the third fastener.

In another more limited aspect, a modular mounting system is provided wherein the second fastener is adapted for interchangeably mounting one or more viewing devices selected from the group consisting of an optical device, opto-electronic device, sighting device, targeting device, night vision goggle device, enhanced night vision goggle device, thermal imaging device, infrared imaging device, short-wave infrared imaging device, and helmet-mounted display screen.

In another more limited aspect, a modular mounting system is provided wherein the helmet mount comprises a pivot assembly that allows the helmet mount to be pivoted between a lower position for use and an upper position for stowage of a night vision monocular device attached to the helmet mount.

In another more limited aspect, a modular mounting system is provided wherein the helmet mount comprises a vertical adjustment mechanism.

In another more limited aspect, a modular mounting system is provided wherein the helmet mount assembly comprises one or both of a tilt adjustment mechanism and a fore-and-aft adjustment mechanism.

In another more limited aspect, the modular mounting system further includes a breakaway connector that causes the helmet mount assembly to detach from the helmet upon the application of a predetermined force.

In another more limited aspect, a modular mounting system is provided wherein the power supply further includes an integral accessory device In yet another more limited aspect, a modular mounting system is provided wherein the integral accessory device is selected from an IR illuminator and a friend-or-foe identification device.

In another more limited aspect, a modular mounting system is provided wherein the helmet mount includes a center bridge member attached to a sliding carriage, the sliding carriage slidable in a fore-and-aft direction. A side mounting member is removably attachable to the center bridge member and the second fastener pivotally attaches to the side mounting member to allow pivoting movement of the night vision monocular about a pivot axis.

In still another more limited aspect, a modular mounting system is provided wherein the pivot axis is parallel to a viewing axis of the night vision monocular.

In yet another more limited aspect, the modular mounting system further includes an IR illuminator on the center bridge member.

In yet another more limited aspect, the modular mounting system further comprises a light sensor on the center bridge member operably coupled to the second fastener to provide a signal representative of an intensity of light impinging on the light sensor, and, circuitry for transmitting the signal to an auto gain circuit of the night vision monocular.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIGS. 4 and 5 are isometric views illustrating the manner of attaching the night vision system herein to a firearm. In FIG. 4, the night vision monocular is positioned in line with the viewing axis of an optical scope. In FIG. 5, the night vision monocular is moved to a position out of line with an optical scope.

DETAILED DESCRIPTION OF THE PREFERRED EMBODIMENTS

Figure 1:
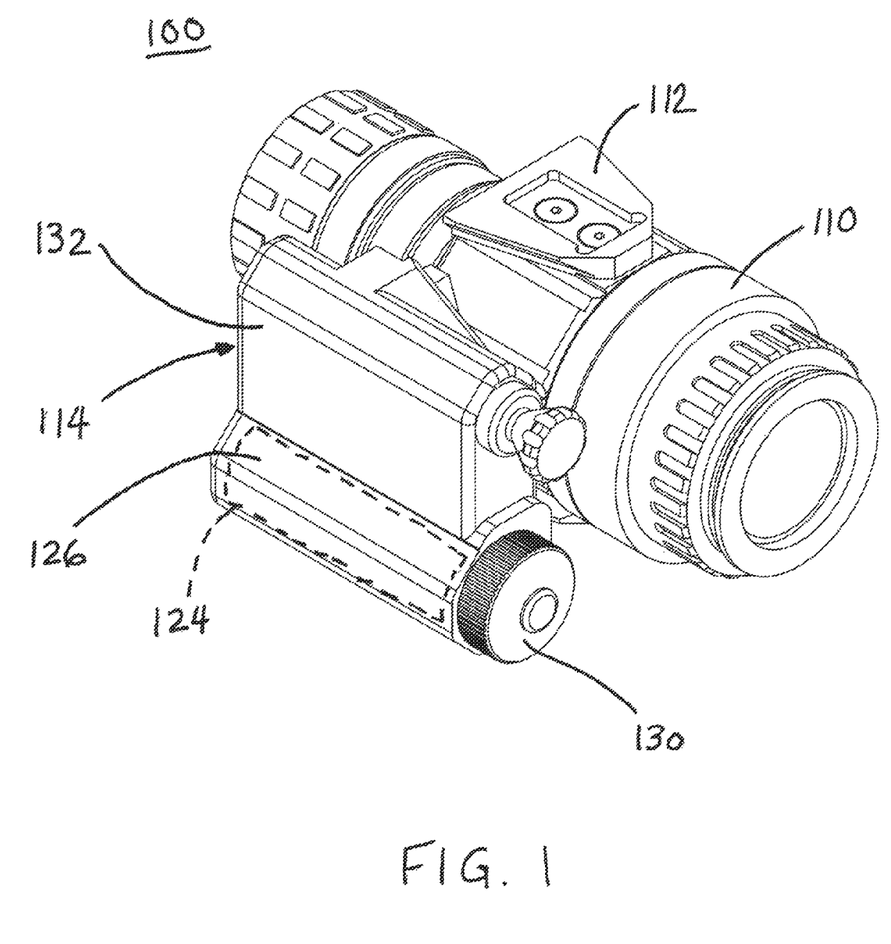
FIG. 1 is an isometric view of an exemplary embodiment night vision system wherein a night vision monocular is used in conjunction with a battery pack and an IR illuminator.
Figure 2:
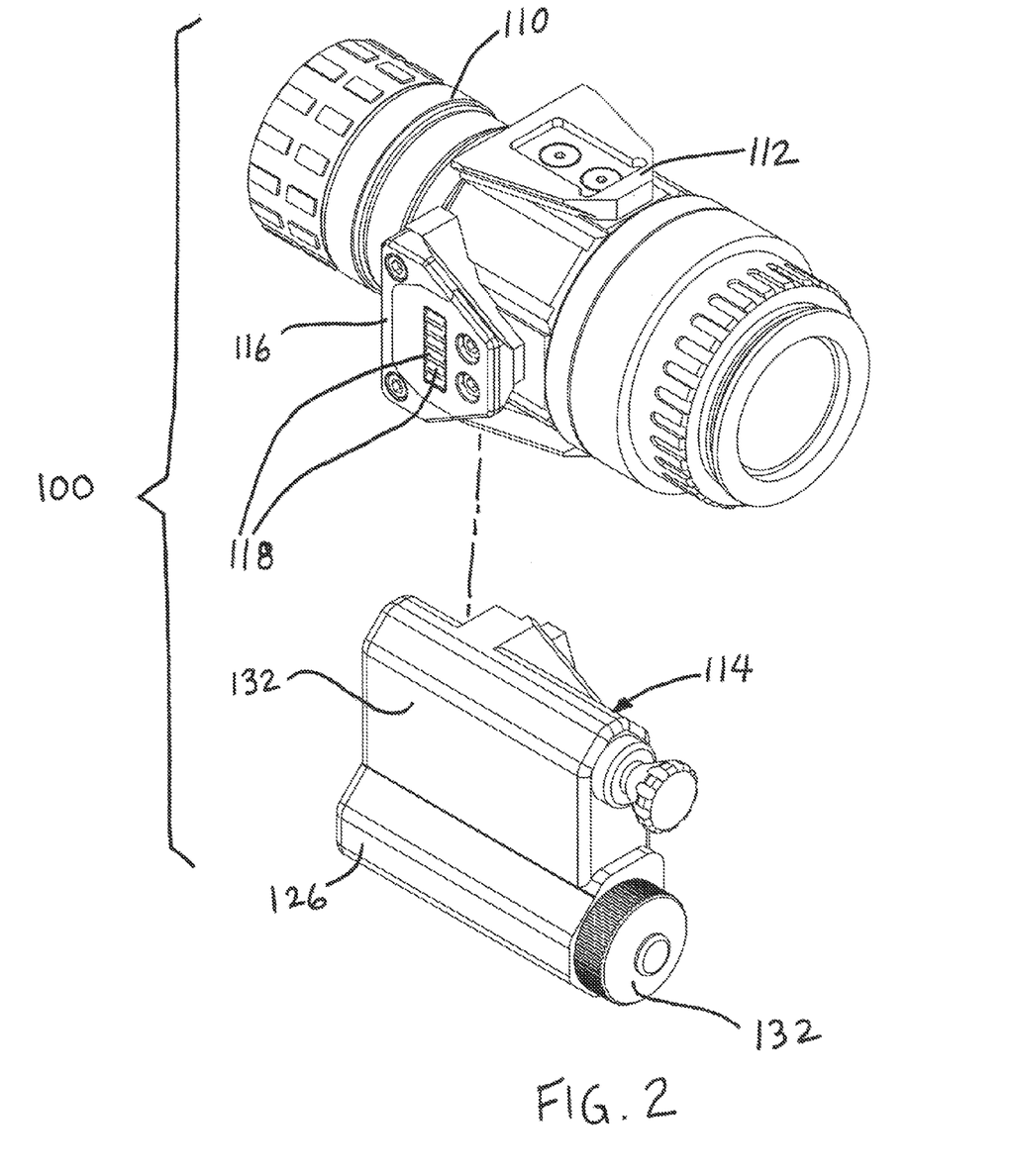
FIGS. 2 and 3 are assembly views of the embodiment appearing in FIG. 1.
Figure 3:
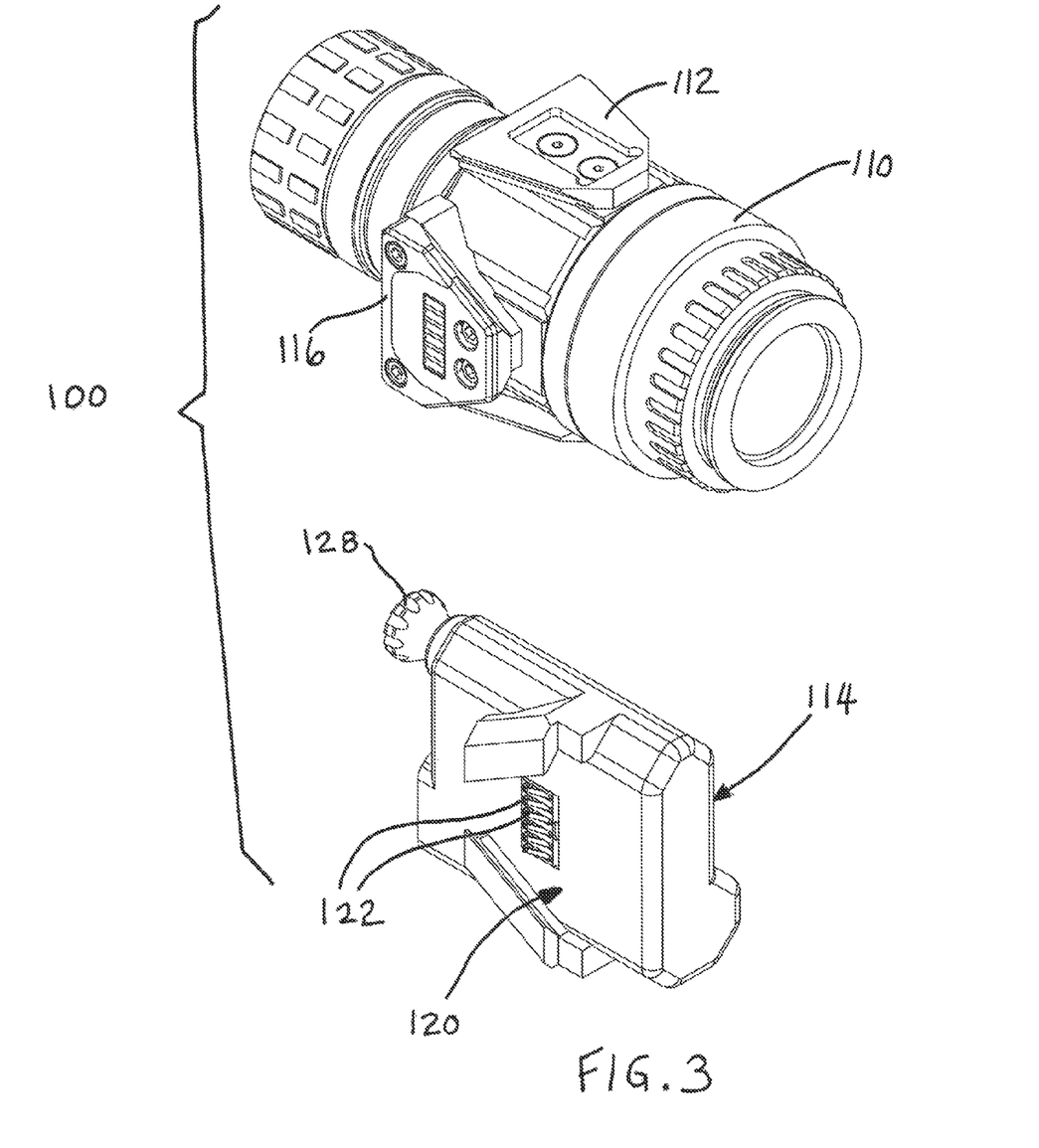

Referring now to the drawings, wherein like reference numerals refer to like or analogous components throughout the several views, FIGS. 1-3 depict an exemplary modular night vision system 100, which includes a night vision monocular device 110. A first mounting interface 112, which may be a standard dovetail mounting shoe, is provided on an upper (in the orientation depicted in FIGS. 1-3) surface of the monocular 110.

A power supply 114 is attached to a second mounting interface 116. The second mounting interface 116 may be a powered interface or hot shoe and, in preferred embodiments, has a standard dovetail configuration. Electrical contacts 118 on the interface 116 contact electrical contacts 122 within a complimentary mounting receptacle 120 on the power supply 114. The contacts 118 and 122 provide an electrical coupling between a battery or battery pack 124 received within a battery compartment 126 of the power supply 114 and the monocular 110. The power supply 114 includes a removable cap or cover 130 for replacement of the battery or battery pack 124. In alternative embodiments, a rechargeable battery or battery pack is contemplated.

In the illustrated preferred embodiment, the power supply 114 further includes an accessory compartment 132 that houses an accessory device, such as an infrared (IR) illuminator or a friend or foe identification (IFF) system. An exemplary IFF system may be of the type including an infrared emitter that emits a unique infrared beacon or signal that is invisible to the naked eye. It is also contemplated that the compartment 132 could house other types of accessory devices. A switch 128 on the housing portion 132 is provided to selectively turn the accessory device on or off.

Figure 4:
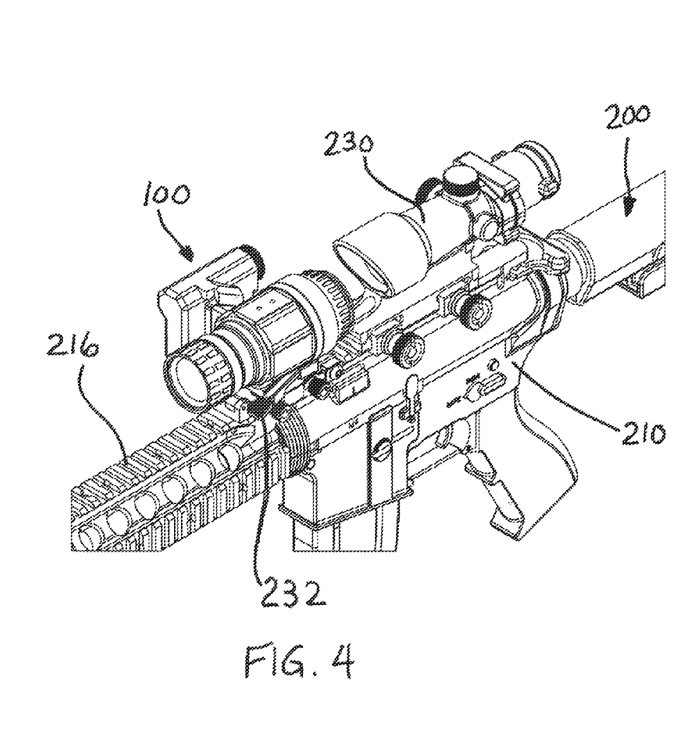
Figure 5:
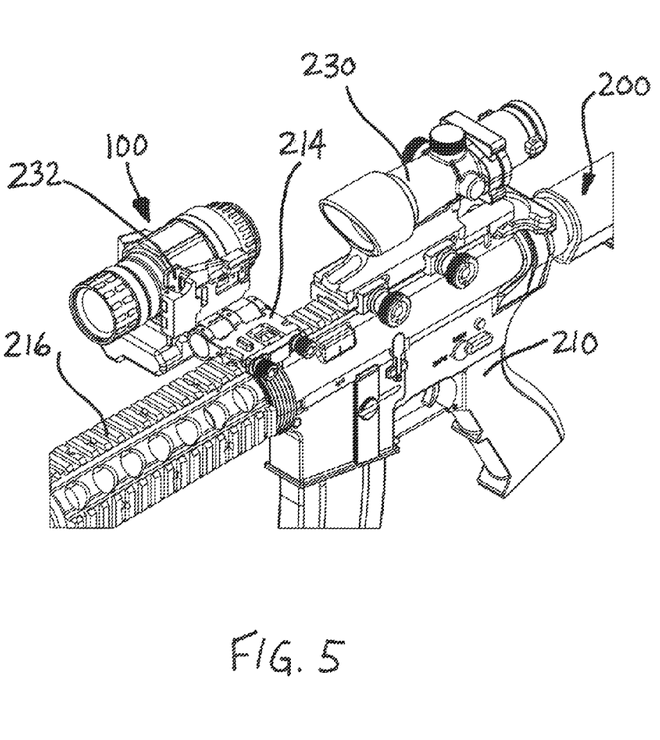
Figure 6:
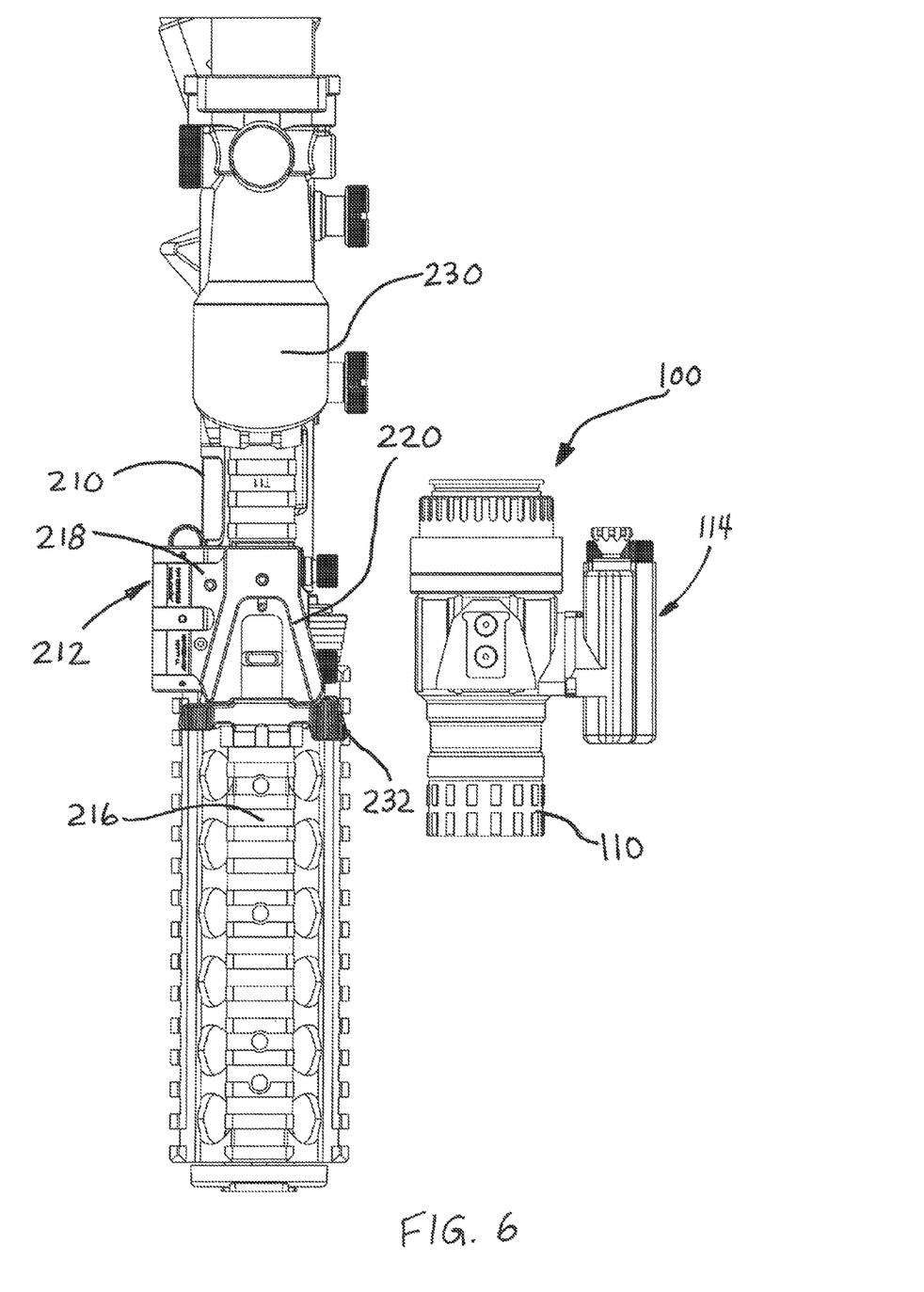
FIG. 6 is a top, exploded view of the embodiment appearing in FIGS. 4 and 5.

Referring now to FIGS. 4-6, there is shown a firearm system 200 employing the modular night vision system 100. The firearm system includes a firearm 210, which may be a military assault rifle such as an M16 rifle, M4 carbine, and so forth. A rail interface 212 includes a rail clamp portion 214 for removably attachment to an accessory rail, such as Picatinny (MIL-STD-1913, STANAG 4640, or equivalent) rail system 216 of the firearm 210. A pivoting portion 218 is pivotally attached to the rail clamp portion 214 and includes a mounting interface or adapter 220 which is complimentary with the mounting shoe 112. The adapter 220 may be, for example, a female dovetail receptacle. In the illustrated application, the system may be positioned in front of, e.g., at the focal point of, an optical scope 230 on the firearm 200 to provide a magnified image of the night vision device image output. A manually actuatable latch 232 is provided to secure the night vision system in the locked position. As shown in FIG. 5, the night vision system 100 may be pivoted out of the line of sight of the scope 230 when not in use, e.g., during daylight conditions, without the need to completely remove the unit 100 from the firearm. Alternatively, as shown in FIG. 6, the unit 100 may be removed from the firearm 200 by removing the mounting shoe 112 from the receptacle 220 of the rail interface 212.

Figure 7:
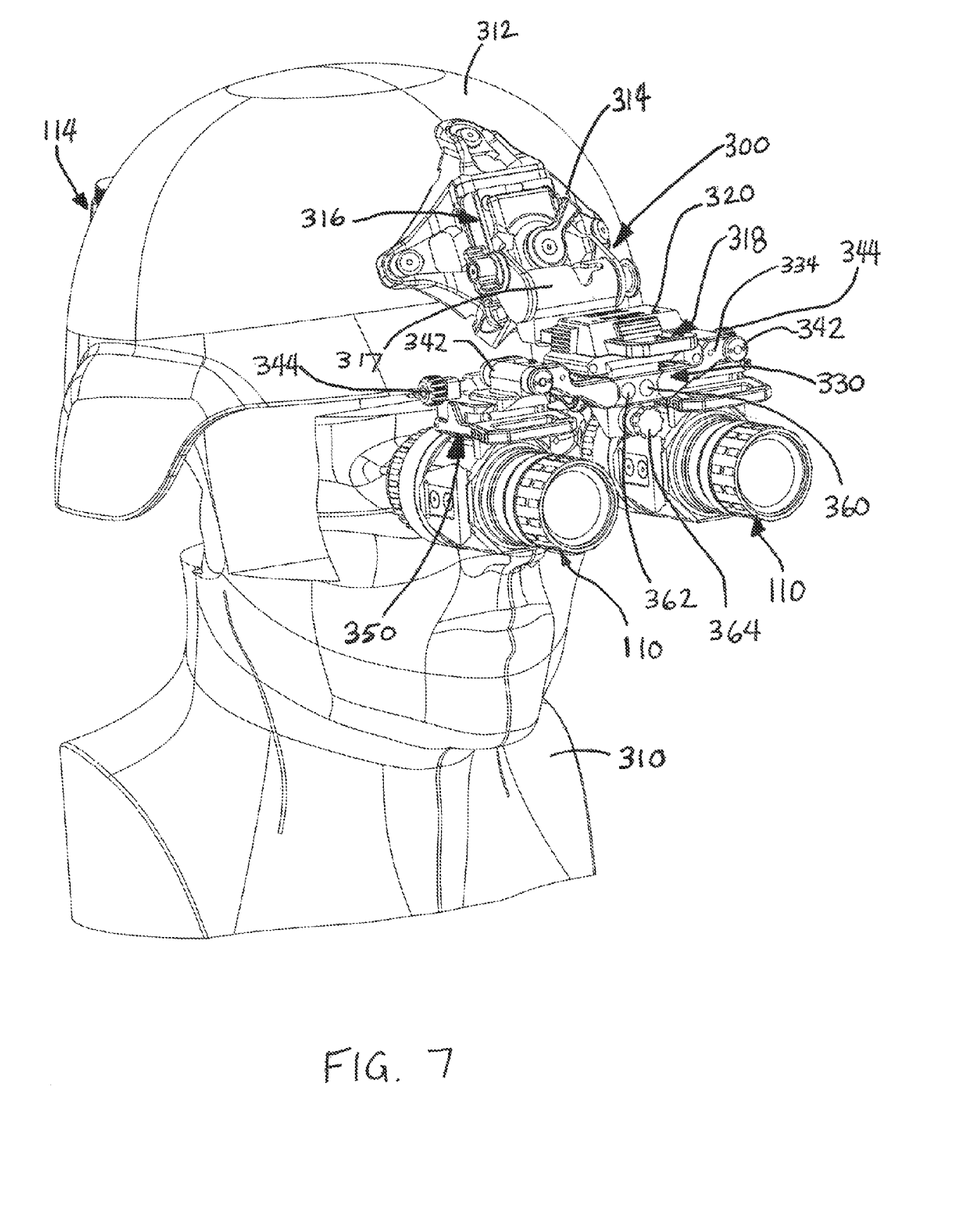
FIG. 7 is an isometric view of a helmet-mounted binocular embodiment.
Figure 8:
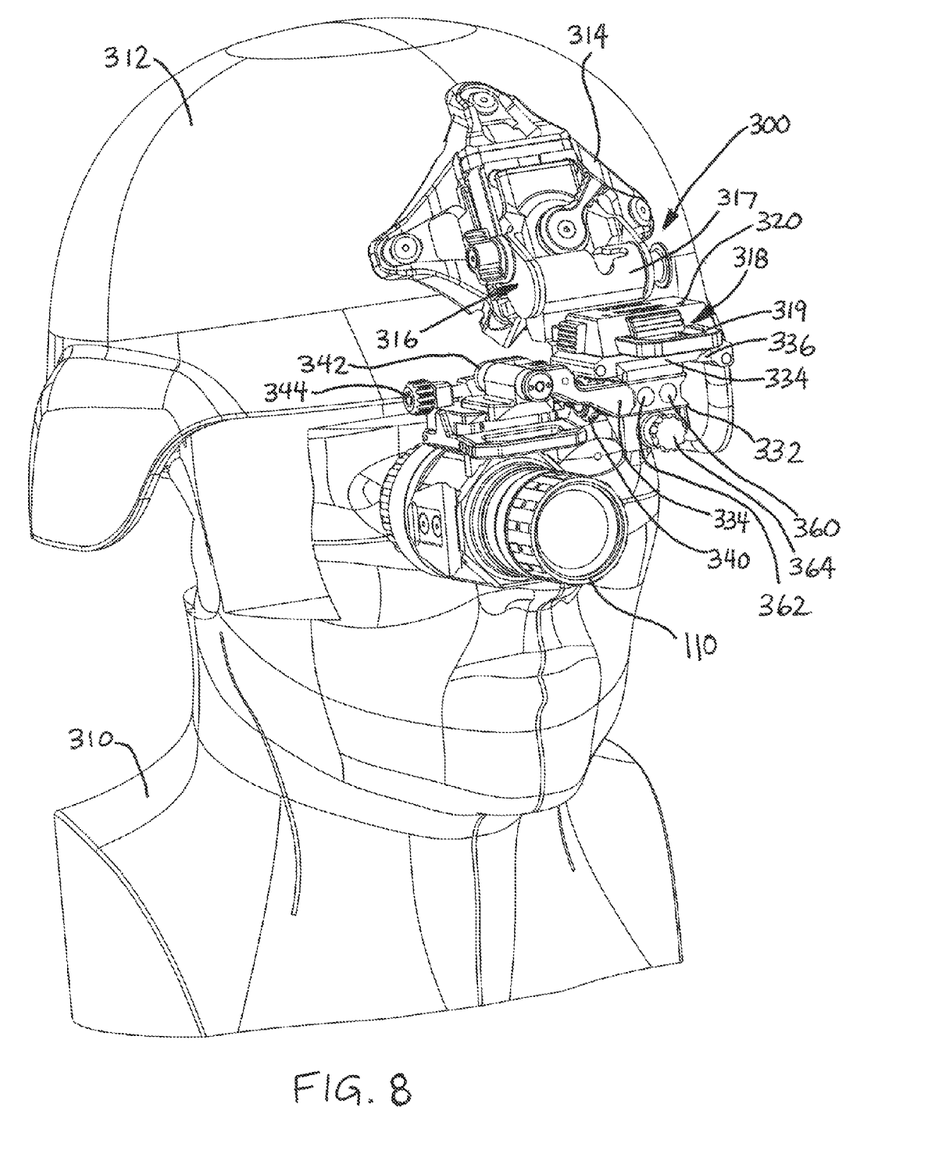
FIG. 8 is an isometric view of a helmet-mounted monocular embodiment.
Figure 9:
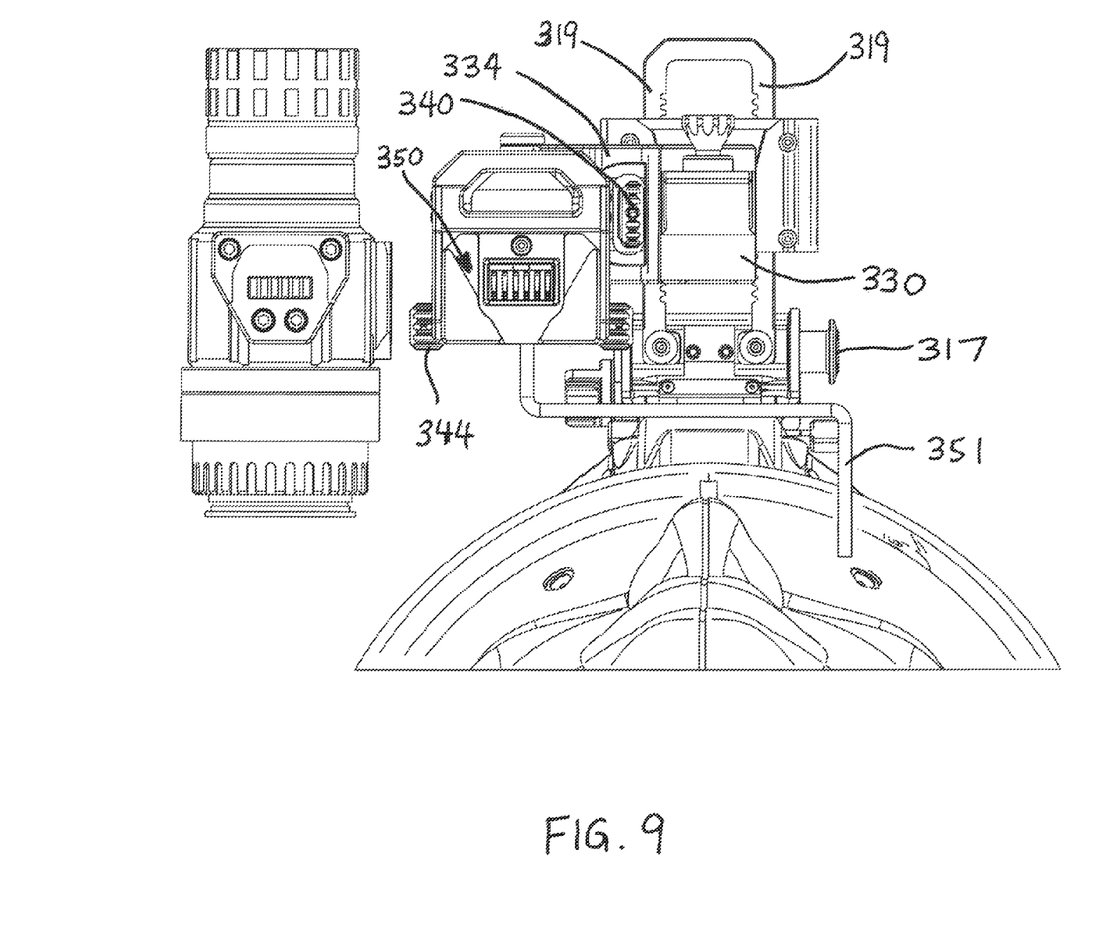
FIG. 9 is a bottom exploded view of a helmet-mounted monocular embodiment.

Referring now to FIGS. 7-9, an interface system for mounting one or a pair of the monocular units 110 to a helmet is illustrated. In FIG. 7 there is shown a pair of monocular units 110 attached to a helmet mounting system 300 to provide a binocular night vision device. In FIG. 8, the mounting system 300 is shown with a single monocular unit 110 attached. Still further embodiments are contemplated wherein a different modality viewing device, such as a thermal imaging device, may be used in place of one or both of the night vision monocular units 110.

The helmet mounting system 300 may be as described in the commonly owned U.S. Pat. No. 7,219,370, incorporated herein by reference in its entirety, or other helmet mounting system as known to those skilled in the art. The helmet mounting system 300 includes a bracket 314 attached to the front portion of the helmet 312. A first pivoting segment 316 is removably attached to the bracket 314 and may include a vertical adjustment mechanism for adjusting the vertical position the devices 110 relative to the eyes of the user 310. The segment 316 may also include a breakaway mechanism e.g., in which the segment 316 (or a portion thereof) will release upon application of a predetermined force.

In certain embodiments, the helmet mount system has a breakaway mechanism. In preferred embodiments wherein a breakaway mechanism is present, an actuator is provided to allow the user to select a breakaway or nonbreakaway attachment. The first segment 316 may also include a tilt adjustment mechanism for adjusting the angle of the optical axis of the viewing devices, and so forth. The vertical adjustment mechanism, tilt axis adjustment mechanism, and breakaway/nonbreakaway features, and so forth, may be as described in commonly owned U.S. Pat. No. 7,219,370 or U.S. Patent Application Publication No. 2013/0083391, each of which is incorporated herein by reference in its entirety.

A second pivoting segment 318 is pivotally attached to the first pivoting segment 316 about a pivot axis or cylinder 317. The second segment 318 comprises rails 319 having a sliding carriage 320 which provides a fore-and-aft adjustment mechanism for positioning the devices 110 at a desired position in front of the user's eyes. Pivoting movement of the second segment 318 relative to the first segment 316 allows the wearer 310 to selectively move the viewing devices between the deployed position as shown in FIGS. 7 and 8 and a stowed position wherein the viewing devices 110 are pivoted up and out of the user's line of sight.

A bridge unit 330 is attached to the sliding carriage 320. The bridge unit 330 comprises three main sections, including a center section 332, and left and right sections 334. The center section 332 is removably attachable to the sliding carriage 320, as shown and described in U.S. application Ser. No. 13/630,695 filed Sep. 28, 2012, the entire contents of which are incorporated herein by reference. The center section 332 includes a mounting shoe 334 for engaging a complimentary receptacle 336 on the lower surface of the sliding carriage 320.

The contacting surfaces of the center section 332 and the respective side sections 334 may be angled or tapered, or otherwise keyed to provide stability and prevent wobbling when in use. In alternative embodiments, the bridge unit 330 may include a center section that is integral with the sliding carriage 320, as shown and described in U.S. application Ser. No. 13/930,534 filed Jun. 28, 2013, the entire contents of which are incorporated herein by reference.

The side sections 334 each include a hinged optical device interface 350 which allow one or both of the viewing devices 110 to be pivoted up and out of the user's line of sight about a hinge 342 when not in use. In this manner, the viewing devices can be pivoted out of the way independently of the hinge 319 of the helmet mount. Pivoting both the hinges 342 in addition to pivoting the segment 318 moves the viewing devices back over the helmet to reduce torque and strain on the user's neck. A lateral adjustment knob 344 is provided on the interface 350, which allows the viewing devices 110 to be laterally aligned with the eyes of the user.

The left and right side sections 334 are attached to the center section 332 on opposite transverse sides and are generally arranged as mirror images of each other. The sections 334 are secured to the center section via a threaded member 340 which is manually rotatably to engage a complimentary threaded opening in the center section 332. Electrical contacts, not shown, may be provided on the mating surfaces of the center section 332 and the side sections 334 to provide electrical communication between the bridge unit 330 and the devices 110. In this manner, when the units 110 are used in a helmet-mounted configuration, the power supply units 114 may be removed and power can be delivered from a remote power supply interface as described below to the center section 320, e.g., via wiring or circuitry in the helmet 312 and helmet mount 300. Alternatively, as shown in FIG. 9, an electrical conductor 351 may be routed from the power supply receptacle 380 (see FIGS. 10 and 11) through the helmet, and directly to the interface 350.

In preferred embodiments, the center section 332 includes an infrared illuminator or flood light 360 and a light sensor 362. A power switch 364 allows the user to selectively actuate the IR illuminator. Power may be provided a power supply interface 380 (see FIGS. 10 and 11) on the back of the helmet 312 via electrical conductors passing through the helmet. In preferred embodiments, the power supply interface 380 is adapted to receive the power supply 114 that has been removed from the monocular device 110.

The light sensor 362 includes a photosensitive element to sense the brightness or intensity of ambient lighting or other light impinging on the photosensor and provides an electrical signal representative of the brightness or intensity to an auto gain circuit of the viewing devices 110, e.g., via electrical contacts on the contacting surfaces of center section 332 and the side sections 334. The signal representative of the ambient lighting is used to control the amplification (gain) of the night vision devices to prevent the user from becoming temporarily blinded in the event of exposure to bright light.

Figure 10:
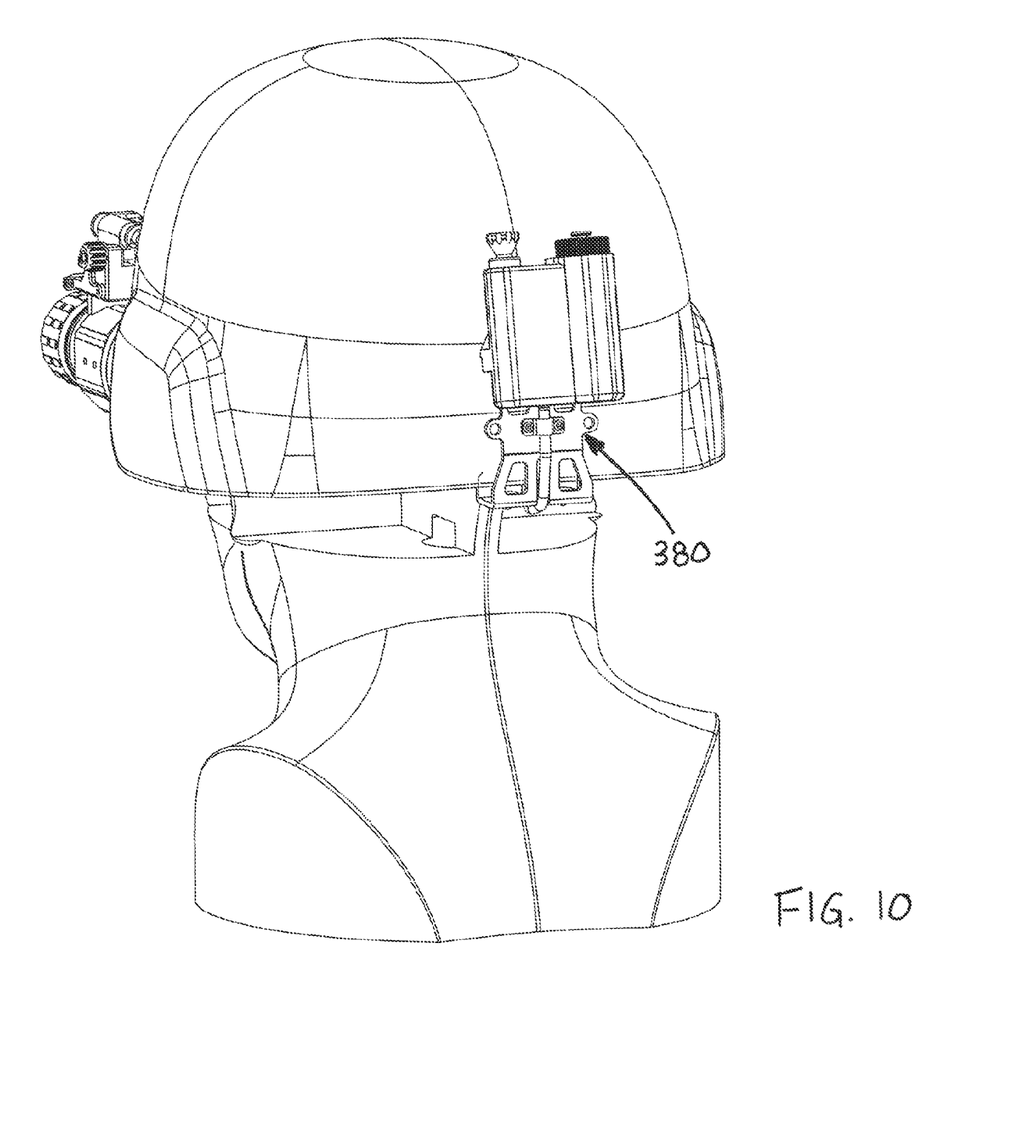
FIG. 10 is a rear isometric view of the FIG. 8 embodiment.
Figure 11:
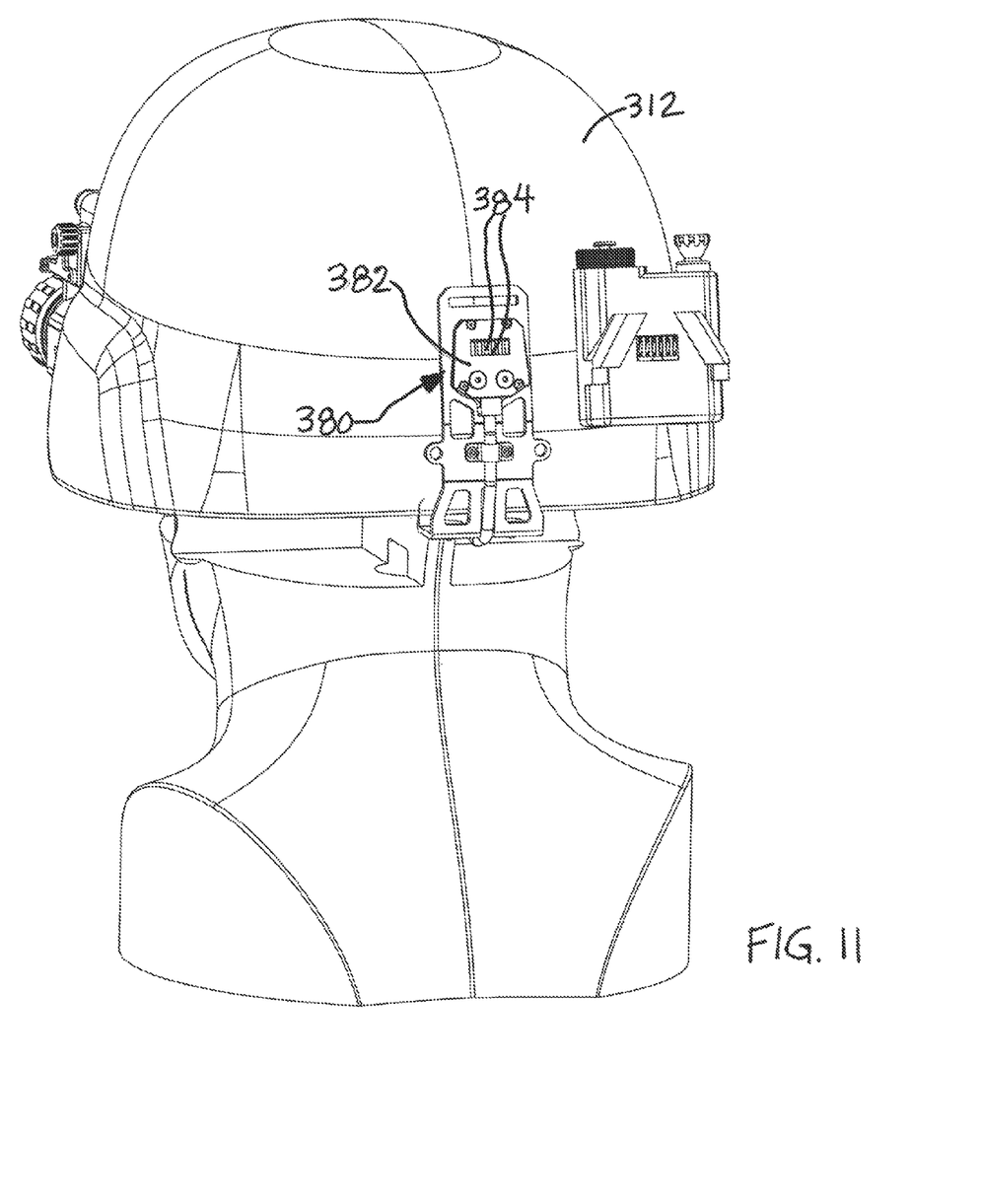
FIG. 11 is an exploded view of the embodiment appearing in FIG. 10.

As illustrated in FIGS. 10 and 11, when the monocular units 110 are used in connection with the helmet interface 300, the power supply 114 may be removed from the mounting shoe 116 and is attached to a battery mount 380 disposed on the rear of the helmet 312. In this manner, the weight of two power supply units 114 can be removed and replaced with the weight of a single power supply unit 114, thereby removing overall weight. In addition, moving the power supply from the imaging devices 110 to the back of the helmet reduces weight on the front of the helmet, thereby reducing the torque and strain on the user's neck.

The battery mount 380 includes a mounting shoe 382 which is removably received in the mounting receptacle 120 on the power supply 114. The electrical contacts 122 on the battery pack 114 contact aligned electrical contacts 384 on the mount 380. The contacts 384, in turn, are electrically coupled to the helmet mount 300, e.g., via conductive elements passing from the rear power supply mount 380 to the helmet mount 300. The conductive elements may be wiring, conductive tracings on a circuit substrate, etc., passing under, over, around, or through the helmet 312.

The invention has been described with reference to the preferred embodiments. Modifications and alterations will occur to others upon a reading and understanding of the preceding detailed description. It is intended that the invention be construed as including all such modifications and alterations.

What is claimed is:

1. A modular mounting system for a night vision device, comprising:
    at least one night vision monocular, each night vision monocular having an imaging tube received within a night vision monocular housing and a plurality of mounting shoes attached directly to the night vision monocular housing and angularly spaced about the night vision monocular housing;
    a power supply accessory device;
    a helmet mount configured to be attached to a first location on a helmet;
    the plurality of mounting shoes including:
        first and second mounting shoes, the first and second mounting shoes being alike and each configured to be removably attached to a complimentary first helmet mount receptacle on the helmet mount; and
        a third mounting shoe disposed between the first and second mounting shoes, the third mounting shoe configured to be removably attached to a complimentary power supply receptacle on the power supply accessory device, the third mounting shoe configured for removable electrical and mechanical coupling of the power supply accessory device and the at least one night vision monocular;

a power supply interface at a second location on the helmet, the power supply interface configured to alternately removably receive the third mounting shoe for electrically coupling the power supply accessory device and the at least one night vision monocular.

2. The modular mounting system of claim 1, wherein the power supply interface includes a first set of electrical contacts configured to contact a second set of electrical contacts on the third mounting shoe when the third mounting shoe is attached to the power supply interface.

3. The modular mounting system of claim 1, wherein the third mounting shoe is further configured to be removably attached to the first helmet mount receptacle on the helmet mount, the third mounting shoe configured for removable electrical and mechanical coupling of the helmet mount and the at least one night vision monocular.

4. The modular mounting system of claim 3, wherein the first helmet mount receptacle includes a first set of electrical contacts configured to contact a second set of electrical contacts on the third mounting shoe when the third mounting shoe is attached to the first helmet mount receptacle.

5. The modular mounting system of claim 1, further comprising a firearm mounting system, the firearm mounting system including:
a rail clamp for removably attaching the firearm mounting system to a rail interface of a firearm; and
a firearm mount interface attached to the rail clamp, the firearm mount interface removably attachable to a selected one of the first and second mounting shoes.

6. The modular mounting system of claim 5, further comprising a hinge pivotally attaching the firearm mount interface to the rail clamp, the hinge pivotal about an axis parallel to an axis of the firearm.

7. The modular mounting system of claim 1, further comprising a second helmet mount receptacle on the helmet mount adjacent the first helmet mount receptacle, the first and second mounting shoes being interchangeably and removably attachable to the first and second helmet mount receptacles.

8. The modular mounting system of claim 7, further comprising:
a first one of the at least one night vision monocular having the first mounting shoe removably attached to the first helmet mount receptacle; and
a second one of the at least one night vision monocular having the second mounting shoe removably attached to the second helmet mount receptacle.

9. The modular mounting system of claim 1, wherein the first helmet mount receptacle is adapted for interchangeably mounting one or more viewing devices selected from the group consisting of an optical device, opto-electronic device, sighting device, targeting device, night vision goggle device, enhanced night vision goggle device, thermal imaging device, infrared imaging device, short-wave infrared imaging device, and helmet-mounted display screen.

10. The modular mounting system of claim 1, wherein the helmet mount comprises a pivot assembly that allows the helmet mount to be pivoted between a lower, operational position and an upper, stowed position.

11. The modular mounting system of claim 1, wherein the helmet mount comprises a vertical adjustment mechanism.

12. The modular mounting system of claim 1, wherein the helmet mount comprises one or both of a tilt adjustment mechanism and a fore-and-aft adjustment mechanism.

13. The modular mounting system of claim 1, further comprising a breakaway connector which causes the helmet mount to detach from the helmet upon application of a predetermined force.

14. The modular mounting system of claim 1, wherein the power supply accessory device includes one or more batteries.

15. The modular mounting system of claim 14, wherein the power supply accessory device further includes an integral accessory device selected from the group consisting of an IR illuminator and a friend-or-foe identification device.

16. The modular mounting system of claim 1, further comprising:
the helmet mount including a center bridge member attached to a sliding carriage, the sliding carriage slidable in a fore-and-aft direction;
a side mounting member removably attachable to the center bridge member;
a hinge defining a pivot axis attaching the first helmet mount receptacle to the side mounting member, the hinge configured to allow pivoting movement of an attached one of the at least one night vision monocular about the pivot axis.

17. The modular mounting system of claim 16, wherein the pivot axis is parallel to a viewing axis of the attached night vision monocular.

18. The modular mounting system of claim 16, further comprising an IR illuminator on the center bridge member.

19. The modular mounting system of claim 16, further comprising:
a light sensor on the center bridge member operably coupled to the first helmet mount receptacle to provide a signal representative of an intensity of light impinging on the light sensor; and
circuitry for transmitting the signal to an auto gain circuit of the night vision monocular when the third mounting shoe is attached to the first helmet mount receptacle.

20. The modular mounting system of claim 1, wherein the first and second mounting shoes are angularly spaced by 180 degrees and the first and third mounting shoes are angularly spaced by 90 degrees.

* * * * *